United States Patent [19]

Mercat et al.

[11] Patent Number: 5,651,591
[45] Date of Patent: Jul. 29, 1997

[54] CYCLE RIM AND WHEEL COMPRISING SUCH A RIM

[75] Inventors: Jean-Pierre Mercat, Chaneins; Alban Minville, Thorins, both of France

[73] Assignee: Mavic S.A., Saint Trivier sur Moignans, France

[21] Appl. No.: 566,424

[22] Filed: Nov. 30, 1995

[30] Foreign Application Priority Data

Nov. 30, 1994 [FR] France ................................ 94 14572

[51] Int. Cl.$^6$ ................................................ B60B 21/06
[52] U.S. Cl. ................................................ 301/95; 301/58
[58] Field of Search ........................... 301/58, 95, 96, 301/97, 98, 55

[56] References Cited

U.S. PATENT DOCUMENTS 5,499,864  3/1996  Klein et al. .................... 301/58 X

FOREIGN PATENT DOCUMENTS

| 0579525 | 1/1994 | European Pat. Off. . |
| 766678 | 1/1934 | France . |
| 1012963 | 7/1952 | France ................................ 301/58 |
| 2351803 | 1/1978 | France ................................ 301/97 |
| 2673888 | 9/1992 | France ................................ 301/95 |
| 2693672 | 1/1994 | France . |
| 4127500 | 10/1992 | Germany . |
| 275801 | 11/1987 | Japan ................................ 301/58 |
| 16340 | 12/1886 | United Kingdom ............... 301/97 |
| WO93/09963 | 5/1993 | WIPO . |

*Primary Examiner*—Russell D. Stormer
*Attorney, Agent, or Firm*—Greenblum & Bernstein, P.L.C.

[57] ABSTRACT

A rim for cycle wheel, provided to receive a tire and having in transverse cross-section two lateral wings forming the two lateral sides of the rim. The two lateral sides are joined at their base by a lower bridge and in their median portion by an upper bridge, so as to produce towards the tip of the wings an annular groove for receiving the tire. The rim has a rectangular global shape in cross-section. The lower bridge has a thickness less than about 0.7 millimeters.

36 Claims, 4 Drawing Sheets

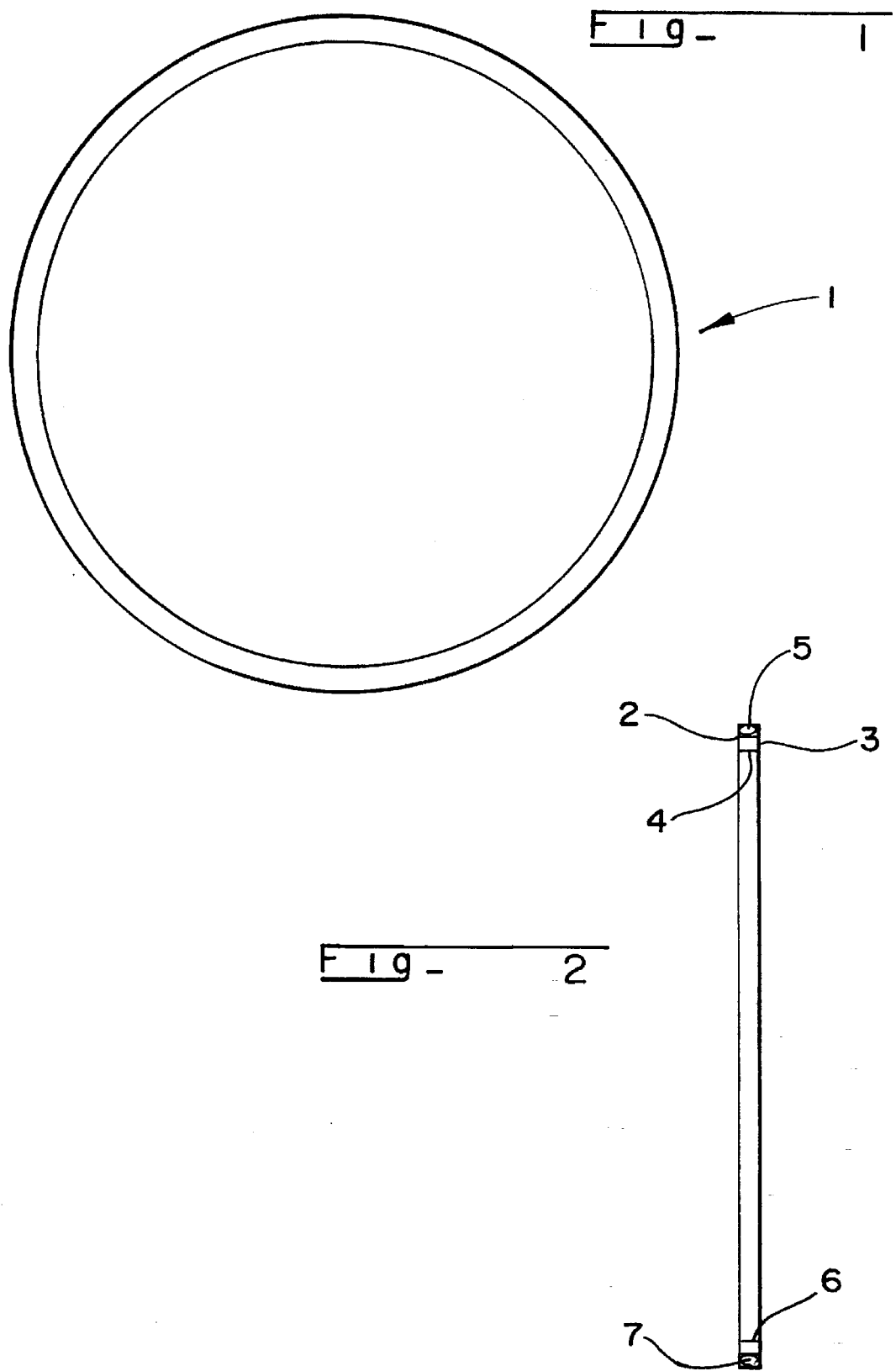

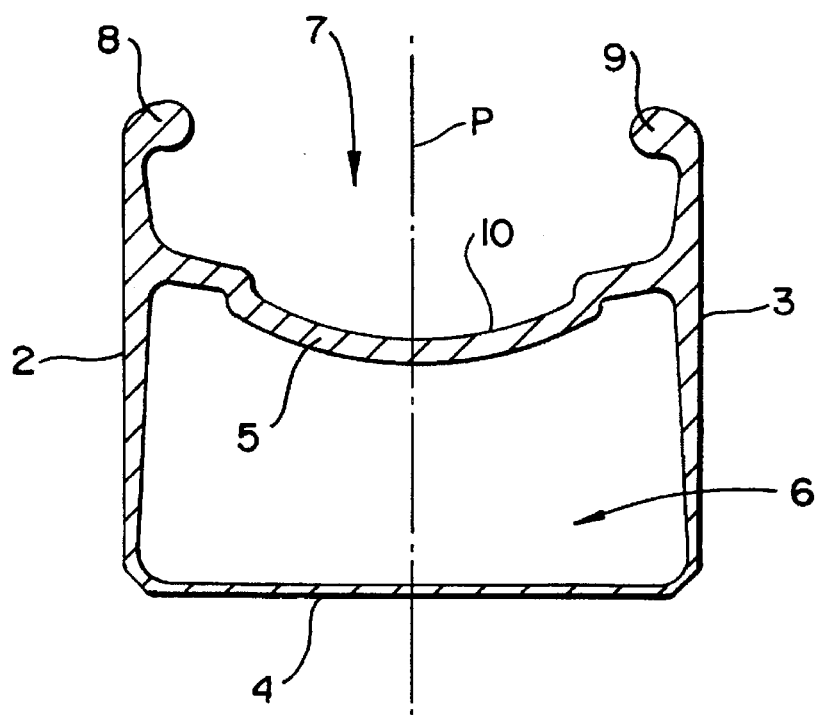
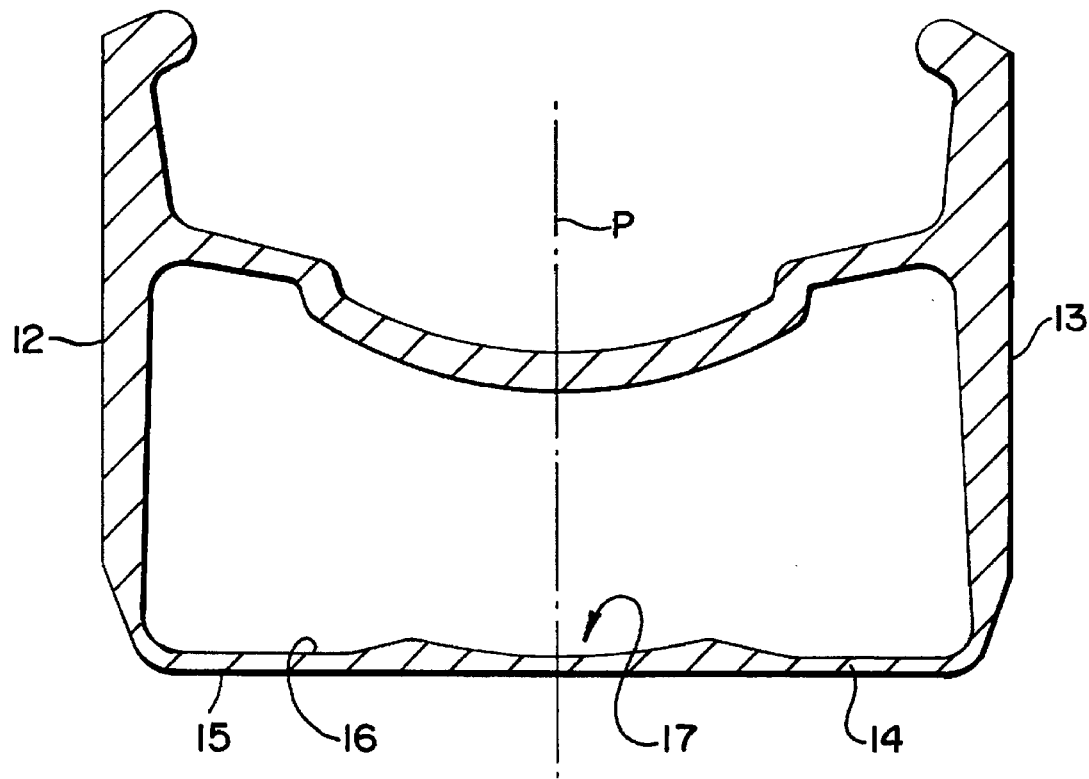

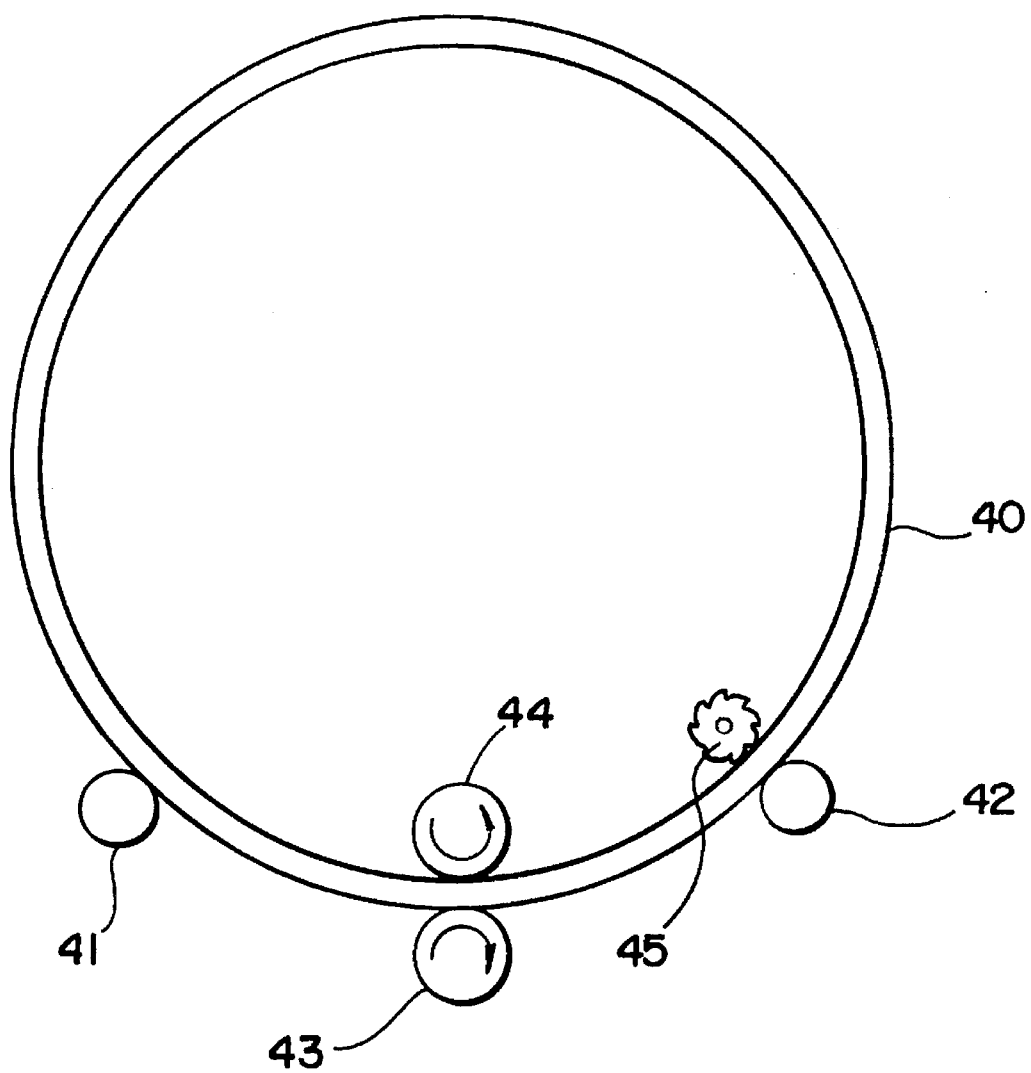

1

CYCLE RIM AND WHEEL COMPRISING SUCH A RIM

BACKGROUND OF THE INVENTION

1. Field of the Invention

The present invention is related to a cycle rim and a cycle wheel comprising such a rim.

More specifically, the invention is related to a rim and a wheel provided to receive a tire, and optionally an inner tube on the interior of the tire. The invention is not related to rims provided to receive a tubular (i.e., "sew-up"), which use rims formed from a pipe that is bent lengthwise and in cross-section.

2. Description of Background and Relevant Information

The rims adapted to receive a pneumatic tire have in a known manner a form having an axis of revolution. They have in cross-section two spaced lateral wings that form the lateral sides of the rim. The wings are joined in their lower portion by a lower bridge, and in their median portion by an upper bridge. The two bridges and the lower portion of the wings form a kind of a casing. The bridges of the casing are bored with a plurality of holes for the passage of wheel spokes. Preferably, the holes are equipped with eyelets mounted by crimping, which improve the linkage between the spokes and the rim.

The casing contributes to the flexional and torsional rigidity of the rim and determines the rigidity and the vertical resistance of the wheel, as well as its rigidity and lateral resistance.

Beyond the upper bridge, the wings extend so as to form with the upper surface of the upper bridge an annular cavity provided to receive the tire, and most often an inner tube. Preferably, the tip of the wings has a bead against which the tire rests, which improves its retention in the groove.

The rims currently available on the market are generally manufactured from a bent sectional bar of aluminum alloy whose both ends are butt-joined, by welding or drawing of a linkage sleeve, or any other appropriate means.

Important physical characteristics to consider in the design of a rim are the weight and the inertial moments of the rim with respect to the neutral axis passing through its center and perpendicular to the direction of a vertical deformation and the axis passing through its center and perpendicular to the direction of a lateral deformation. These physical characteristics are related to the material used and to the dimensions of the rim.

The dimensions of the rims are relatively set. Indeed, the dimensions of the upper cavity are determined from the usual dimensions of pneumatic tires. As for the dimensions of the walls of the casing, they are determined by the desired physical characteristics to be obtained. They likewise take into account the forces generated by the tension of the spoke. Another constraint taken into account is the extrusion of the sectional bar which is to make up the rim, and the joining of its two ends after bending. Indeed, it is known that the extrusion of a shaped element with a thin wall is delicate and can only be carried out at slow speed, which is not very compatible with productivity-related preoccupations. For an assembly technique of welding, in particular, spark welding, it is difficult to obtain an appropriate weld on an extremely thin wall.

With respect to the annular groove where the tire is housed, it is known that the tire exerts a relatively substantial outward force due to its inflation. As a result, the wings must be of ample dimensions in thickness.

For these different reasons, there is a current tendency to utilize sectional bars of relatively substantial and regular thickness, with a reinforced lower bridge to assure a good retention of the spokes and a good mechanical linkage between the spokes and the rim.

SUMMARY OF THE INVENTION

A problem addressed by the present invention is that of improving the physical characteristics of the existing rims, or at least a portion thereof.

Such problem is resolved by the rim according to the invention which is characterized by the fact that it has a generally rectangular shape in cross-section, and that the lower bridge has a thickness less than about 0.7 millimeters along the largest portion of its width.

Indeed, is has been found that by providing the rim with a generally rectangular shape, it is possible to obtain improved torsional and flexional resistance characteristics. Moreover, by decreasing the thickness of the lower bridge, it is possible to decrease the volume of the material, and therefore the weight and the kinetic inertia of the rim without prejudice to the resistance of the rim.

According to a secondary characteristic, the final shape of the rim in cross-section is obtained from a rim having a thickness wall thicker than that machined so as to locally decrease the thickness of the wall. Thus, the extrusion of the sectional bar and the joining of its two ends after bending do not present any particular difficulty given that these operations are carried out with a shaped element having a greater thickness.

BRIEF DESCRIPTION OF DRAWINGS

The invention will be better understood by reading the description that follows, with reference to the annexed drawings which form an integral part thereof.

FIG. 1 is a side elevation view of a rim;

FIG. 2 is a cross-sectional view of the rim of FIG. 1;

FIG. 3 is a cross sectional view of a rim according to a first embodiment of the invention;

FIG. 4 shows an variation of embodiment;

FIG. 7 shows one of the embodiments of the rim according to the invention.

DETAILED DESCRIPTION OF THE INVENTION

Figure 5:
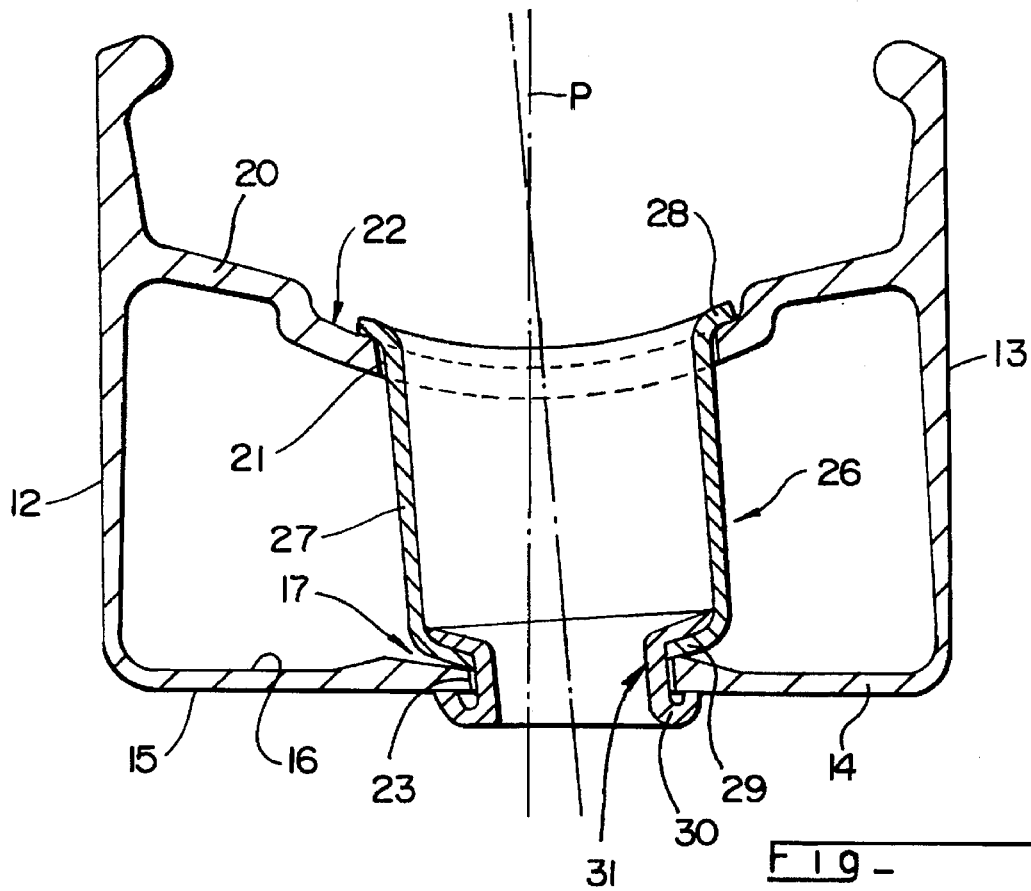
FIG. 5 shows a cross-section of the rim of FIG. 4 in the raw state.

FIG. 1 schematically shows a rim 1 in the form of a ring having a large diameter. In known fashion, the ring 1 is formed from a segment of a shaped element made out of aluminum alloy, or the like, which is bent, and whose two ends are butt-joined by any appropriate means, in particular by welding or fitting of a linkage sleeve.

In cross-section, shown in FIG. 2, the shaped element of rim 1 has in a known fashion two lateral wings 2 and 3. The wings are joined at their base by a lower bridge 4. They are also connected in their median portion by an upper bridge 5. The lower portion of wings 2 and 3 forms with the bridges 4 and 5 a casing 6 which constitutes an important component of the flexional and torsional rigidity of the rim.

In a known fashion, the two bridges of the rim are bored with a plurality of holes adapted to receive the spoke nipples. Preferably, these holes are provided with eyelets that are affixed to the rim. This will be described in more detail hereinafter.

Also in a known fashion, spokes are provided to connect the rim to a hub, in order to form a wheel.

As shown in FIG. 3, the wings 2 and 3 of the rim extend beyond the upper bridge 5 and form with such bridge an annular groove 7 whose cross-section is U-shaped. This groove is located on the exterior of the casing 6. It is provided to receive a tire and, if necessary, an inner tube. Preferably, the wings have in their upper portion and towards the interior a bead 8, 9 which improves the retention of the lateral sides of the tire in the rim.

FIG. 3 shows a cross-section of the rim according to a first embodiment of the invention. The rim shown has a cross-section of a generally rectangular shape. In particular, the lower bridge 4 is generally flat in transverse cross-section and orthogonal to the two lateral wings 2 and 3 and to longitudinal median plane or plane of symmetry P. Therefore, the rim has a cylindrical lower bridge in revolution.

The lower bridge 4 has a low thickness with respect to the remainder of the rim. This thickness is less than about 0.7 millimeters. It can be on the order of 0.5 millimeters, for example.

The wings 2 and 3 have a thickness that increases from their junction with the lower bridge. At their junction with the lower bridge, the wings have substantially the same thickness as the bridge itself.

Preferably, the thickness of the wings is maximum at the junction with the upper bridge. Therebeyond, the thickness of the wings decreases up the beads 7 and 8.

The upper bridge 5 has a thickness greater than that of the lower bridge 4. In the embodiment shown, the upper bridge has a downwardly extending arcuate depression or corrugation 10 in its central portion, which forms an annular seat. Such seat is provided to receive the eyelets. This will be described in more detail hereinafter.

The rectangular shape that the rim has in cross-section provides very good torsional and flexional rigidity characteristics. At the level of the cross-section, the wings are forced to space apart. Indeed, as a result of its inflation, the tire has a tendency to expand outwardly. These forces are exerted in the area of the upper portion of the wings. The upper bridge mainly operates in tension. Indeed, it retains the wings spaced apart. On the contrary, the lower bridge operates in compression. It prevents the upper portion of the wings from distancing itself by taking support on the upper bridge.

The lower bridge is substantially orthogonal to the wings. Furthermore, it is relatively distanced. For these reasons, it is possible to use a lower bridge having a small thickness. Indeed, even with a low thickness, the lower bridge opposes a sufficient resistance to the forces to which it subjected, which are essentially compression constraints. The thickness of the wings is maximum in the area of the junction with the upper bridge. It is in fact in this wing area that the internal forces are the strongest.

This general shape of the cross-section of the rim results in a reduction of mass, therefore of weight and kinetic inertia while maintaining good rigidity characteristics of the rim.

It must be noted that the rim hereinabove is particularly well-adapted to wheels equipped with tires. It is not intended for tubular rims for which the problem is not posed in the same manner. Indeed, the forces developed on the rim by inflation of the tube in tubulars are very low since the tube is a volume closed on itself.

In the embodiment shown in FIG. 3, the rim has in cross section a height on the order of 17.5 millimeters, and a width on the order of 20.5 millimeters. Casing 6 has a height on the order of 9.5 millimeters. The thickness of the lower bridge is constant, and is on the order of 0.5 millimeters. The wings have a thickness slightly greater than 1 millimeter at the junction with the upper bridge. The upper bridge has a substantially constant thickness on the order of 1 millimeter. Of course, these values are non-limiting for the invention.

FIG. 4 shows a variation of embodiment. According to this variation, the lower bridge 14 is generally planar and perpendicular to the two wings 12 and 13. Its external surface 15 is rectilinear in transverse cross-section. However, its internal surface 16 is corrugated and has an annular seat 17 provided to receive the spoke eyelets. This will be described in more detail hereinafter. The thickness of the lower bridge varies here, but remains generally less than 0.7 millimeters. However, it possible that the thickness of the lower bridge can be locally greater than 0.7 millimeters on the two lateral edges of the seat, so as to obtain the desired shape for the central seat 17. In any case, the thickness of the lower bridge 14 is less than about 0.7 millimeters over the largest portion of its width. This thickness can even be on the order of 0.5 mm.

FIG. 5 shows a cross-section of the same rim in the area of an eyelet provided to support a spoke.

The upper bridge 20 is bored with a hole 21 located in the median portion of its seat 22. The lower bridge 14 is likewise bored with a smaller hole 23 located in the central portion of the seat 17. Preferably, the eyelets utilized with the present rim are of the double type, i.e., each eyelet crosses the casing 25 and takes support on each of the bridges 14 and 20. The eyelets thus create mechanical linkages at regular intervals between the two bridges of the rims, which contribute to its rigidity.

With reference to FIG. 5, the eyelet 26 has a body 27 of a generally cylindrical shape that has a collar or shoulder 28 at its upper portion. The upper shoulder 28 is provided to be housed in the seat 22 of the upper bridge.

The body has towards the base a narrower neck 29 that crosses the hole 23 of the neck 29 lower bridge. Upon closing, at the body 27 creates a lower shoulder provided to rest against the internal surface 16 of the lower bridge 14, in the seat 17 in the axis of hole 23. The body 27 is affixed to the bridge 14 in the area of its neck 29 by a crimping ring 30 whose wall is deformed so as to pinch the lower portion of body 27 and the lower bridge 14 together.

The crimping ring 30 has in its central portion a hole 31 in which the spoke and its nipple are fitted.

In a known manner, the spoke rests against the base of the eyelet by means of its nipple. The lower bridge 14 is biased by the tractional forces of the spoke, but the body of the eyelet returns a portion of the forces towards the upper bridge.

This type of eyelet is particularly advantageous in the present case, because the forces of the spoke are taken up jointly by the two bridges. The upper bridge relieves the lower bridge of a large number of these forces. These linkages compensate for the low thickness of the lower bridge.

The seats 17 and 22 of the two bridges are curved. The curvature is provided to be capable of placing the eyelet in alignment with the orientation of the nipple of the spoke.

Indeed, one of the techniques used for fitting the spokes comprises boring the rim along two slightly angularly offset orientations, each of these orientations corresponding to the general orientation of the spokes. The eyelets are positioned in the alignment of each of these two orientations. FIG. 5 shows an eyelet positioned according to one of these orientations. According to another technique for fitting eyelets, the rim is bored with holes oriented in a radial fashion, and the eyelets are fitted in the holes along this radial orientation. Each crimping ring has an enlarged central hole to enable the spoke nipple to be offset in order to take the orientation of the spoke which it retains.

However, this method for mounting of the eyelets is not essential for the invention, and other types of eyelets could be suitable, in particular simple eyelets. Likewise, other methods for mounting the spokes could be suitable, for example, a washer could be added in the area of the nipple to increase the bearing surface of the nipple on one of the bridges.

The rim is formed out of any appropriate material, for example aluminum alloy, titanium alloy, or any other material that offers a good compromise between weight and resistance (i.e., strength). In the case where the rim is formed from a shaped element made of aluminum alloy, one knows that it is difficult to obtain a shaped element with low thickness by extrusion, and to join the two ends thereof. Indeed, the two ends a relatively fragile for the joining.

Therefore, the invention proposes to form a rim from a segment of a shaped element whose cross-section has a more substantial thickness, i.e., a thickness that can be obtained by extrusion without any particular difficulty. Then, during manufacture of the rim, the thickness of the shaped element is reduced so as to provide the desired final shape in cross-section.

Figure 6:
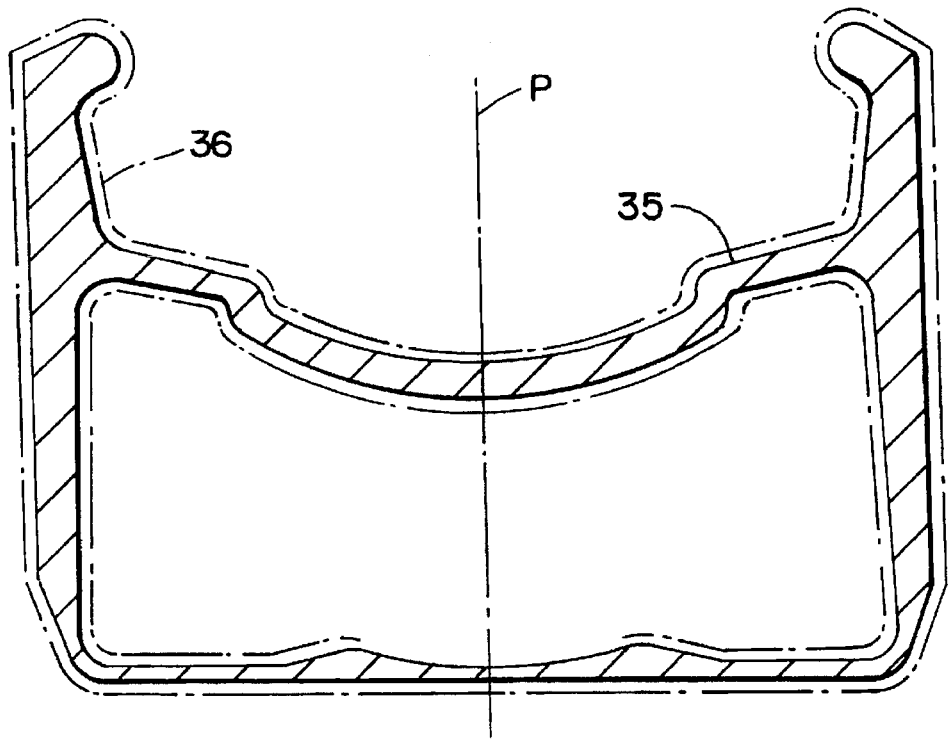
FIG. 6 shows the rim of FIG. 4 in cross-section at the level of an eyelet.

To illustrate this, FIG. 6 shows in cross-section two shaped elements of the rim imbricated in one another. The interior contour, represented by the full line 35 is the final section of the shaped element that one desires to obtain. The exterior contour, represented by the dotted line 36 is the section of the raw bar a segment of which is cut, bent and then butt-joined to form the rim. The raw contour has a greater thickness than the final contour. This thickness is generally equal to or greater than the thickness of the traditional shaped element. Its extrusion does not pose any particular problem, at least with respect to the extrusion velocity. The butt-assembly is obtained by means of a sleeve, or it can be obtained by a welding technique. Since the thickness of the shaped element is close to the traditional thickness, the assembly does not pose any particular problem either.

The rim is then machined to bring its thickness to the desired dimensions. A chemical machining technique can be used which comprises immersing the rim in a chemical bath that attacks the material of the rim by dissolution in a uniform fashion. This attack occurs on all surfaces of the rim, including the interior of the casing. Indeed, the holes for the eyelets obtained essentially after the butt-assembly enable the chemical product to penetrate inside the casing.

For the shaped element of the rim shown in FIG. 6, the chemical attack results in dissolving the thickness of the material between the dotted line 36 and the full line 35.

The rim can then be subjected to finishing operations such as machining of the sides to form braking surfaces in accordance to what has been described in the Patent Application published as No. FR 2 693 672, anodization, and fitting of the eyelets.

According to another technique, the thickness of the raw shaped element is reduced by a mechanical machining, for example milling or turning. However, this machining can only be carried out on external surfaces, i.e., the external surfaces of the wings and the external surface of the lower bridge. The upper bridge cannot be machined. This is not a hinderance, inasmuch as this bridge is relatively thick. Therefore, the raw bar can be extruded with an upper bridge having the desired final thickness.

FIG. 7 illustrates a mechanical machining technique of the lower bridge of the rim.

The rim 40 rests on two supports rollers 41 and 42. It is furthermore driven by two driving rollers 43 and 44 positioned opposite one another, the rim passing between these two rollers. The two rollers 43 and 44 are driven at synchronous speeds. They are for example located between the two support rollers.

A milling cutter 45 or another machining tool, for example a grinding wheel, is positioned on the interior of the rim, opposite one of the support rollers, for example roller 42, while being oriented parallel to the roller. The milling cutter is driven in rotation. It machines the external surface of the lower bridge by pressing the rim against roller 42. In this fashion, the machining dimension is relatively precise. Indeed, it is taken in reference at the height of the rim, independent of the general curvature radius thereof. One knows indeed that as long as the rim is not equipped with its hub and spokes, its curvature radius is not perfectly constant. The rim can be generally or locally oval.

Preferably, the initial thickness of the lower bridge can be measured in the area of the holes provided for the eyelets. The post-machining thickness can be controlled in the area of these holes.

In the case where the lateral sides of the rim are also machined, in accordance to what has been described in French Patent Application published as 2 693 672, the two machining operations of the lower bridge and lateral sides can be combined on the same support of the rim that is schematically represented in FIG. 7.

Of course, the present description is only given by way of example, and other embodiments of the invention could be adopted without leaving the scope thereof.

The instant application hereby claims the invention described in the French Patent Application No. 94 14572, filed Nov. 30, 1994, the disclosure of which is hereby incorporated by reference thereto and the priority of which is hereby claimed under U.S. 35 U.S.C. 119.

Finally, although the invention has been described with reference to certain alloys, configurations, and method steps, it is to be understood that the invention is not limited to the particulars disclosed and extends to all equivalents within the scope of the claims

What is claimed:

1. A rim for a cycle wheel adapted to have a tire mounted thereon, said rim comprising:

a pair of lateral sides forming, in transverse cross section, a pair of lateral wings, each of said sides having a lower end and an upper end;

a lower bridge joining said sides at said lower ends to form a base having a predetermined width;

an upper bridge joining said sides at respective locations between said upper and lower ends;

said upper ends projecting upwardly from said upper bridge and forming, with said upper bridge, an annular groove for receiving the tire;

said pair of lateral sides, said upper bridge, and said lower bridge form a substantially rectangular shape in transverse cross section; and said lower bridge has a thickness of less than about 0.7 millimeters over at least a major portion of said predetermined width of said lower bridge.

2. A rim according to claim 1, wherein:

each of said pair of lateral sides increases in thickness from a respective one of said lower ends to a respective one of said locations between said upper and lower ends at which said sides are joined by said upper bridge.

3. A rim according to claim 2, wherein:

each of said pair of lateral sides decreases in thickness from a respective one of said locations at which said sides are joined by said upper bridge toward a respective one of said upper ends.

4. A rim according to claim 1, wherein:

said lower bridge comprises a substantially cylindrical external surface in revolution perpendicular to a plane of symmetry.

5. A rim according to claim 1, wherein:

said lower bridge comprises a substantially cylindrical internal surface.

6. A rim according to claim 1, wherein:

said lower bridge includes a corrugated internal surface, thereby forming an annular seat, at a median plane of symmetry of the rim, for seating a spoke.

7. A rim according to claim 1, wherein:

said pair of lateral sides have lateral surfaces formed by a method comprising the step of machining.

8. A rim according to claim 1, wherein:

said lower bridge comprises an external surface formed by a method of machining with a milling cutter, said method comprising the step of pressing the rim against a support roller.

9. A rim according to claim 1, wherein:

said lower bridge extends generally perpendicularly to said longitudinal median plane.

10. A rim according to claim 1, wherein:

said lower bridge extends generally perpendicularly to said lateral sides.

11. A rim according to claim 1, wherein:

said upper bridge comprises, at least in a central portion, a downwardly extending arcuate depression.

12. A rim for a cycle wheel adapted to have a tire mounted thereon, said rim comprising:

a pair of lateral sides forming, in transverse cross section, a pair of lateral wings, each of said sides having a lower end and an upper end;

a lower bridge joining said sides at said lower ends to form a base having a predetermined width;

an upper bridge joining said sides at respective locations between said upper and lower ends;

said upper ends projecting upwardly from said upper bridge and forming, with said upper bridge, an annular groove for receiving the tire;

said pair of lateral sides, said upper bridge, and said lower bridge form a substantially rectangular shape in transverse cross section;

said lower bridge has a thickness of less than about 0.7 millimeters over at least a major portion of said predetermined width of said lower bridge;

a plurality of eyelets for mounting a plurality of spokes to the rim, each of said eyelets connected to and extending between said lower bridge and said upper bridge;

each of said eyelets comprising an upper support shoulder seated upon an external surface of said upper bridge and a lower support shoulder seated upon an internal surface of said lower bridge.

13. A rim according to claim 12, wherein:

each of said pair of lateral sides increases in thickness from a respective one of said lower ends to a respective one of said locations between said upper and lower ends at which said sides are joined by said upper bridge.

14. A rim according to claim 13, wherein:

each of said pair of lateral sides decreases in thickness from a respective one of said locations at which said sides are joined by said upper bridge toward a respective one of said upper ends.

15. A rim according to claim 12, wherein:

said lower bridge comprises a substantially cylindrical external surface in revolution perpendicular to a plane of symmetry.

16. A rim according to claim 12, wherein:

said lower bridge comprises a substantially cylindrical internal surface.

17. A rim according to claim 12, wherein:

said lower bridge includes a corrugated internal surface, thereby forming an annular seat, at a median plane of symmetry of the rim, for seating a spoke.

18. A rim according to claim 12, wherein:

said pair of lateral sides have lateral surfaces formed by a method comprising the step of machining.

19. A rim according to claim 12, wherein:

said lower bridge comprises an external surface formed by a method of machining with a milling cutter, said method comprising the step of pressing the rim against a support roller.

20. A rim according to claim 12, wherein:

said lower bridge extends generally perpendicularly to said longitudinal median plane.

21. A rim according to claim 12, wherein:

said lower bridge extends generally perpendicularly to said lateral sides.

22. A rim according to claim 12, wherein:

said upper bridge comprises, at least in a central portion, a downwardly extending arcuate depression.

23. A cycle wheel adapted to have a tire mounted thereon, said wheel comprising:

a rim comprising:

a pair of lateral sides forming, in transverse cross section, a pair of lateral wings, each of said sides having a lower end and an upper end;

a lower bridge joining said sides at said lower ends to form a base having a predetermined width;

an upper bridge joining said sides at respective locations between said upper and lower ends;

said upper ends projecting upwardly from said upper bridge and forming, with said upper bridge, an annular groove for receiving the tire;

said pair of lateral sides, said upper bridge, and said lower bridge form a substantially rectangular shape in transverse cross section; and said lower bridge has a thickness of less than about 0.7 millimeters over at least a major portion of said predetermined width of said lower bridge.

24. A wheel according to claim 23, further comprising:

a plurality of eyelets for mounting a plurality of spokes to the rim, each of said eyelets connected to and extending between said lower bridge and said upper bridge;

each of said eyelets comprising an upper support shoulder seated upon an external surface of said upper bridge and a lower support shoulder seated upon an internal surface of said lower bridge.

25. A wheel according to claim 23, further comprising:

a plurality of spokes seated in respective ones of said eyelets.

26. A rim according to claim 23, wherein:

each of said pair of lateral sides increases in thickness from a respective one of said lower ends to a respective one of said locations between said upper and lower ends at which said sides are joined by said upper bridge.

27. A rim according to claim 26, wherein:

each of said pair of lateral sides decreases in thickness from a respective one of said locations at which said sides are joined by said upper bridge toward a respective one of said upper ends.

28. A rim according to claim 23, wherein:

said lower bridge comprises a substantially cylindrical external surface in revolution perpendicular to a plane of symmetry.

29. A rim according to claim 23, wherein:

said lower bridge comprises a substantially cylindrical internal surface.

30. A rim according to claim 23, wherein:

said lower bridge includes a corrugated internal surface, thereby forming an annular seat, at a median plane of symmetry of the rim, for seating a spoke.

31. A rim according to claim 23, wherein:

said pair of lateral sides have lateral surfaces formed by a method comprising the step of machining.

32. A rim according to claim 23, wherein:

said lower bridge comprises an external surface formed by a method of machining with a milling cutter, said method comprising the step of pressing the rim against a support roller.

33. A rim according to claim 23, wherein:

said lower bridge extends generally perpendicularly to said longitudinal median plane.

34. A rim according to claim 23, wherein:

said lower bridge extends generally perpendicularly to said lateral sides.

35. A rim according to claim 23, wherein:

said upper bridge comprises, at least in a central portion, a downwardly extending arcuate depression.

36. A rim for a cycle wheel adapted to have a tire mounted thereon, said rim comprising:

a pair of lateral sides forming, in transverse cross section, a pair of lateral wings, each of said sides having a lower end and an upper end;

a lower bridge joining said sides at said lower ends to form a base having a predetermined width;

an upper bridge joining said sides at respective locations between said upper and lower ends;

said upper ends projecting upwardly from said upper bridge and forming, with said upper bridge, an annular groove for receiving the tire;

said pair of lateral sides, said upper bridge, and said lower bridge form a substantially rectangular shape in transverse cross section; and said lower bridge has a thickness of about 0.5 millimeters over at least a major portion of said predetermined width of said lower bridge.

* * * * *